United States Patent
Chen et al.

(10) Patent No.: US 11,239,734 B2
(45) Date of Patent: Feb. 1, 2022

(54) DOUBLE STATOR ROTATING ELECTRICAL MACHINE

(71) Applicant: ABB Schweiz AG, Baden (CH)

(72) Inventors: Wenliang Chen, Västerås (SE); Jahirul Islam, Västerås (SE)

(73) Assignee: ABB Schweiz AG, Baden (CH)

( * ) Notice: Subject to any disclaimer, the term of this patent is extended or adjusted under 35 U.S.C. 154(b) by 259 days.

(21) Appl. No.: 16/095,644

(22) PCT Filed: Apr. 25, 2017

(86) PCT No.: PCT/EP2017/059707
§ 371 (c)(1),
(2) Date: Oct. 22, 2018

(87) PCT Pub. No.: WO2017/186664
PCT Pub. Date: Nov. 2, 2017

(65) Prior Publication Data
US 2019/0131855 A1 May 2, 2019

(30) Foreign Application Priority Data
Apr. 26, 2016 (EP) .................................. 16167092

(51) Int. Cl.
*H02K 16/04* (2006.01)
*H02K 1/18* (2006.01)
(Continued)

(52) U.S. Cl.
CPC ............ *H02K 16/04* (2013.01); *H02K 1/185* (2013.01); *H02K 1/187* (2013.01); *H02K 16/00* (2013.01);
(Continued)

(58) Field of Classification Search
CPC ........ H02K 16/00; H02K 16/04; H02K 1/185; H02K 1/187; H02K 21/12; H02K 2201/03; H02K 2213/03
(Continued)

(56) References Cited

U.S. PATENT DOCUMENTS 6,819,026 B2 11/2004 Narita et al.
8,558,426 B2 10/2013 Stiesdal
(Continued)

FOREIGN PATENT DOCUMENTS

CN 103178668 A 6/2013
CN 204517605 U 7/2015
(Continued)

OTHER PUBLICATIONS

Chinese Office Action and Translation Application No. dated Oct. 15, 2019 4 pages.
(Continued)

*Primary Examiner* — Bernard Rojas
(74) *Attorney, Agent, or Firm* — Whitmyer IP Group LLC

(57) ABSTRACT

It is provided a multi-stator rotating electrical machine including: an inner stator; an outer stator; a rotor provided radially between inner stator and the outer stator; an inner gap distance between the rotor and the inner stator; and an outer gap distance between the rotor and the outer stator. An average of the inner gap distance is between 75 and 80 percent of an average of the outer gap distance.

3 Claims, 3 Drawing Sheets

(51) Int. Cl.
  *H02K 21/12*  (2006.01)
  *H02K 16/00*  (2006.01)
(52) U.S. Cl.
  CPC ......... *H02K 21/12* (2013.01); *H02K 2201/03* (2013.01); *H02K 2213/03* (2013.01)
(58) Field of Classification Search
  USPC .......................................... 310/112–114, 266
  See application file for complete search history.

(56) References Cited

U.S. PATENT DOCUMENTS

| | | | |
|---|---|---|---|
| 9,030,071 B2 | 5/2015 | Bradley et al. | |
| 2013/0264895 A1* | 10/2013 | Kondou | H02K 1/06 310/46 |
| 2014/0184174 A1* | 7/2014 | Diedrichs | H02K 19/26 322/61 |
| 2016/0065010 A1* | 3/2016 | Kondou | H02K 1/18 310/91 |
| 2016/0164386 A1* | 6/2016 | Kusase | H02K 1/276 310/156.01 |
| 2019/0305704 A1* | 10/2019 | Frampton | H02K 7/1815 |

FOREIGN PATENT DOCUMENTS

| | | |
|---|---|---|
| JP | 2014155373 A | 8/2014 |
| JP | 2014233189 A | 12/2014 |
| WO | 2013032401 A1 | 3/2013 |

OTHER PUBLICATIONS

Zhao Wenliang et al: "Comparative Study on Novel Dual Stator Radial Flux and Axial Flux Permanent Magnet Motors With Ferrite Magnets for Traction Application", IEEE Transactions on Magnetics, IEEE Service Center, New York, NY, US, Nov. 1, 2014 (Nov. 1, 2014): 4 pages.

Shuangxia Niu: "Design, control and application of double-stator permanent magnet brushless machines", Jan. 1, 2009 (Jan. 1, 2009): 184 pages.

Fei Zhao et al: "Dual-stator Interior Permanent Magnet Vernier Machine Having Torque Density and Power Factor Improvement", Electric Power Components and Systems, vol. 42, No. 15, Nov. 18, 2014 (Nov. 18, 2014): 12 pages.

Zuropean Search Report Application No. EP 16 16 7092 Completed: Aug. 24, 2016;dated Aug. 30, 2016 10 pages.

Jez Radoslaw et al.: "Influence of air-gap length and cross-section on magnetic circuit parameters", Jan. 1, 2014 (Jan. 1, 2014): Retrieved from the internet: URL:http://www.comsol.nl/paper/download/199469/polit_paper.pdf [retrieved on Oct. 3, 2018] 6 pages.

International Search Report and Written Opinion of the International Searching Authority Application No. PCT/EP2017/059707 Completed: Jul. 3, 2017; dated Jul. 10, 2017 14 pages.

Asgar Majid et al: "Radial Force Reduction in a New Flat-Type Double-Stator Switched Reluctance Motor", IEEE Transactions on Energy Conversion, IEEE Service Center, Piscataway, NJ, US, Mar. 1, 2016 (Mar. 1, 2016): 10 pages.

\* cited by examiner

DOUBLE STATOR ROTATING ELECTRICAL MACHINE

TECHNICAL FIELD

The invention relates to a double stator rotating electrical machine. More specifically, in embodiments presented herein the average gap distances between the rotor and the stators are different to reduce radial forces on the rotor.

BACKGROUND

Double stator machine are rotating electrical machines which have been studied extensively in the last 20 years due to both high power density and ability to provide redundant operation. Permanent magnets are often applied to provide rotor excitation in double stator electrical machines.

Such a multi-stator electrical machine is e.g. disclosed in WO 2016001495, providing an electromagnetic motor with radial flux, intended in particular to aid power-assisted steering in a motor vehicle. The motor comprises at least two stators surrounding at least one rotor, an air gap being defined between each of the stators and the surrounded rotor.

In FEI ZHAO ET AL: "Dual-stator Interior Permanent Magnet Vernier Machine Having Torque Density and Power Factor Improvement", ELECTRIC POWER COMPONENTS AND SYSTEMS, vol. 42, no. 15, 18 Nov. 2014 (2014 Nov. 18), pages 1717-1726, it is presented an improved topology for a low-speed permanent magnet vernier machine, called a dual-stator interior permanent magnet vernier machine, to significantly increase torque density and power factor.

In rotating electrical machines, when there is any asymmetry in the gap (such as air gap) between rotor and stator, forces are greatly amplified along a radial direction of the machine. The reason for the asymmetry can be manufacturing inaccuracies of the stator or rotor dimensions, or wear of bearings. Such a force can be a great issue for the machine and may cause further damage and failure of the machine, and/or expensive and space consuming over-dimensioning of components.

SUMMARY

It is an object to reduce the ill-effects due to asymmetries in multi-stator rotating electrical machines.

According to a first aspect, it is provided a multi-stator rotating electrical machine comprising: an inner stator; an outer stator; a rotor provided radially between inner stator and the outer stator; an inner gap distance between the rotor and the inner stator; and an outer gap distance between the rotor and the outer stator. An average of the inner gap distance is between 75 and 80 percent of an average of the outer gap distance. By providing an inner gap which is smaller than the outer gap, difference in total radial forces of the gaps are compensated for, whereby any asymmetries in gaps are reduced, or even essentially eliminated, by opposing forces from the two gaps. This reduces detrimental forces on the electrical machine which reduces dimensioning requirements and thus cost on the electrical machine.

The average inner gap distance may satisfy the following equation:

$$(d(F\_tot))/d\delta_i = 0,$$

where F_tot represents total radial force.

The average outer gap distance may satisfy the following equation:

$$(d(F\_tot))/d\delta_o = 0,$$

where F_tot represents total radial force.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Embodiments presented herein relate to multi-stator rotating electrical machines (such as motors and generators), where the inner gap distance is smaller than the outer gap distance. As shown below, this results in better matching of opposing forces appearing due the asymmetries in the inner gap and outer gap distance. Hence, detrimental radial forces on the rotor due to asymmetries are reduced.

Figure 1:
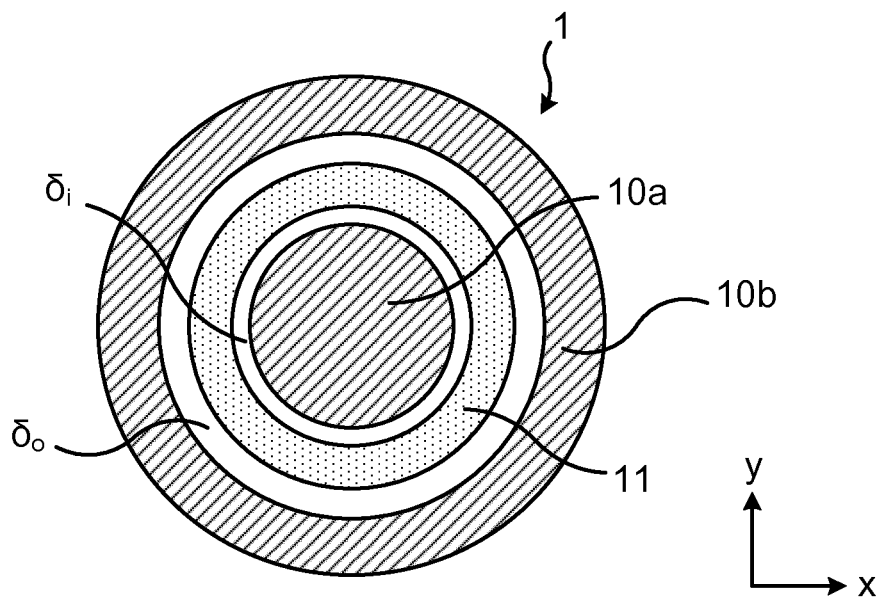
FIG. 1 is a schematic cross sectional diagram illustrating a multi-stator electrical machine according to one embodiment.

FIG. 1 is a schematic cross sectional diagram illustrating a multi-stator electrical machine 1 according to one embodiment. The electrical machine 1 can operate as a motor and/or generator. The diagram is along an x-y plane. The machine 1 comprises both an inner stator 10a and an outer stator 10b. A rotor 11 is provided radially between the inner stator 10a and the outer stator 10b. In this way, there is an inner gap distance $\delta_i$ between the rotor 11 and the inner stator 10a and an outer gap distance $\delta_o$ between the rotor 11 and the outer stator 10b. Significantly, an average of the inner gap distance $\delta_i$ is between 75 and 80 percent of an average of the outer gap distance $\delta_o$. The distances of the gaps are herein measured as radial distances. The gaps can be air gaps;

however, the gaps could alternatively contain any other suitable fluid. Due to having both the inner gap and the outer gap, the multi-stator electrical machine 1 can be composed of two electrical machines. An inner machine is provided using the inner stator and the rotor and an outer machine is provided using the outer stator and the rotor. The two machines can in some ways operate independently which provides redundancy, albeit with reduced performance, e.g. if one stator were to fail.

The inventors have found that the range between 75 and 80 is optimal in many rotating electrical machines to balance the opposing inner and outer radial forces in a case of asymmetry. If the percentage is less than 75 percent, the inner radial force can dominate and if the percentage is more than 80 percent, the outer radial force can dominate.

Figure 2:
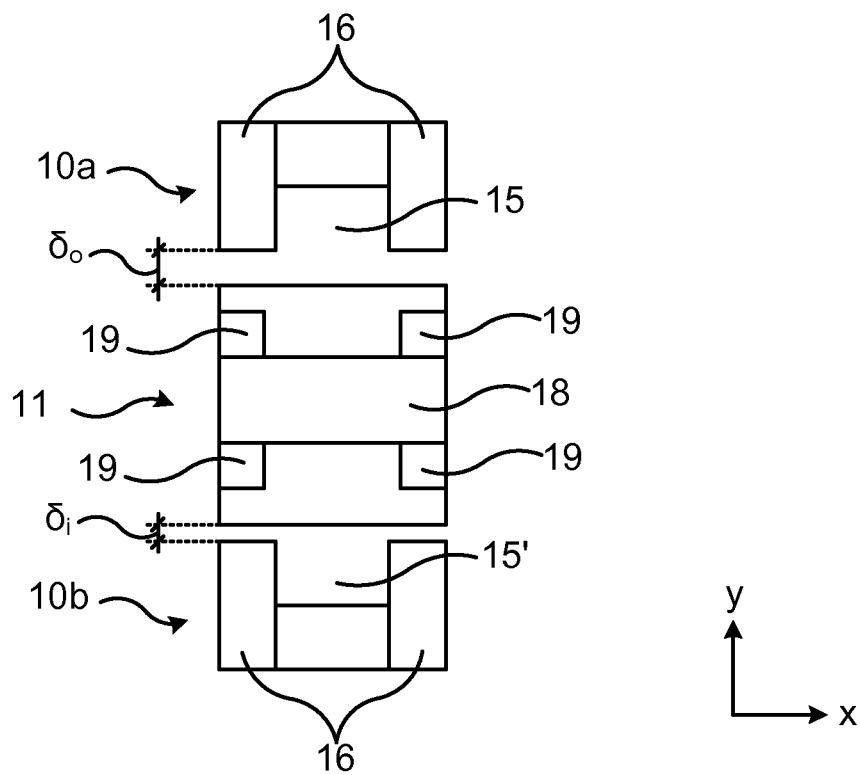
FIG. 2 is a partial magnification of the cross sectional diagram of FIG. 1.

FIG. 2 is a partial magnification of the cross sectional diagram of FIG. 1. Here, stator teeth 16 of both the inner stator 10a and the outer stator 10b are shown, along with a resulting stator slot 15, where stator windings can be provided. The rotor 11 comprises permanent magnets 19 affixed to a rotor yoke 18.

Figure 3:
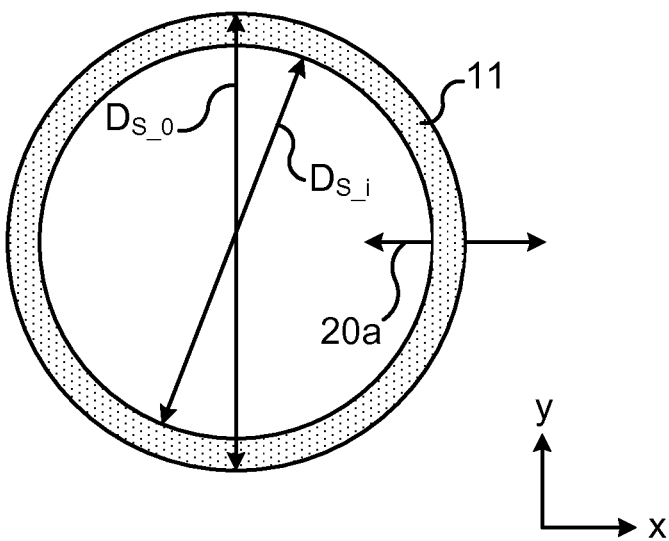
FIG. 3 is a schematic cross sectional diagram focusing on the rotor of the multi-stator electrical machine of FIG. 1 according to one embodiment.

FIG. 3 is a schematic cross sectional diagram focusing on the rotor of the multi-stator electrical machine 1 of FIG. 1 according to one embodiment. The diagram is along the x-y plane.

The rotor 11 has an inner diameter $D_{s\_i}$ and an outer diameter $D_{s\_o}$. As explained in more detail below, there is an inner radial force 20a directed towards the centre of the machine 1 as well as an outer radial force 20b in the opposite direction, directed away from the centre of the machine 1.

The forces on the rotor 11 and their relationship with the gap distances $\delta_i$ and $\delta_o$ will now be explained in more detail with references to FIGS. 1-3.

In conventional electrical machines, there are forces along the radial directions attracting the stator and rotor together, caused by the asymmetry of the gap distance. The reason for this asymmetry is largely due to manufacturing errors of the stator or rotor dimensions, or wear of the bearings. The value of this force is calculated according to [1]:

$$f_r(\delta, t, \gamma) = \frac{1}{2\mu_0}(B(\delta, t, \gamma)_r^2 - B(\delta, t, \gamma)_t^2) * \frac{D_s}{2} * l * d\gamma \quad [1]$$

where $\mu_0$ is the permeability of air, $B_r$ and $B_t$ are the radial and tangential flux densities respectively as function of time and radial angle (and gap distance as explained below), $D_s$ is the minimum gap diameter, l is the active length of the double stator machine, $\delta$ is the gap distance, $\gamma$ is the rotor angular position in the range of 0 to $2\pi$ radians. At a smaller gap distance, flux density increases, and consequently the radial electromagnetic force becomes stronger compared to larger gap distances, and vice versa.

In electrical machines 1 with more than one gap as shown in FIGS. 1 and 2, the electromagnetic radial force subjecting on rotor body is the sum of forces from the outer and inner stators. Notably, the direction of the outer radial force from the outer stator is opposite from the inner radial force of the inner stator.

$$f_{r\_o}(\delta_o, t, \gamma) = \frac{1}{2\mu_0}(B(\delta_o, t, \gamma)_{r\_o}^2 - B(\delta_o, t, \gamma)_{t\_o}^2) * \frac{D_{s\_o}}{2} * l * d\gamma \quad [2]$$

-continued $$f_{r\_i}(\delta_i, t, \gamma) = \frac{1}{2\mu_0}(B(\delta_i, t, \gamma)_{r\_i}^2 - B(\delta_i, t, \gamma)_{t\_i}^2) * \frac{D_{s\_i}}{2} * l * d\gamma \quad [3]$$

Equation [2] presents the outer radial force 20b $f_{r\_o}$ and equation [3] presents the inner radial force 20a $f_{r\_i}$.

The directions of two individual radial forces 20a, 20b can be seen in FIG. 3. Considering the fact that $D_{s\_o}$ is larger than $D_{s\_i}$, the total force, being the sum of these two forces 20a, 20b, is in the same direction as the force from outer stator, with the value of $f_{r\_o}(\delta_o,t,\gamma)-f_{r\_i}(\delta_i,t,\gamma)$.

An optimization function can be derived from equations [2] and [3] for minimizing the total force as a function of outer gap distance, inner gap distance, as presented in [4].

$$f_{tot}=f_{r\_o}(\delta_o,t,\gamma)-f_{r\_i}(\delta_i,t,\gamma)=F(\delta_i,\delta_o,D_{s\_i},D_{s\_o},l) \quad [4]$$

The most fundamental constrain functions are that the torques from two individual machines are kept the same as the reference designs.

$$T_{tot}=T_{r\_o}(\delta_o)+T_{r\_i}(\delta_i)=T_{rated} \quad [5]$$

From [4] and [5], a new set of inner and outer gap distances $\delta_i$, $\delta_o$ are selected to maintain the output power constant while reducing the radial electromagnetic forces during eccentricity fault.

Optimal selection of inner gap distance selection would then satisfy equation [6]:

$$(d(F\_tot))/d\delta_i=0 \quad [6]$$

Alternatively or additionally, optimal selection of outer gap distance selection would then satisfy equation [7]:

$$(d(F\_tot))/d\delta_o=0 \quad [7]$$

While reducing the inner gap distance is preferable as explained below, the same effect on forces can be achieved by adjusting the outer gap distance.

In particular, the average gap distance of the outer machine is larger than the distance in the inner machine. In one embodiment, $\delta_o$=4 mm and $\delta_i$=2 mm. In another embodiment, $\delta_o$=6.5 mm and $\delta_i$=5 mm.

Figure 4:
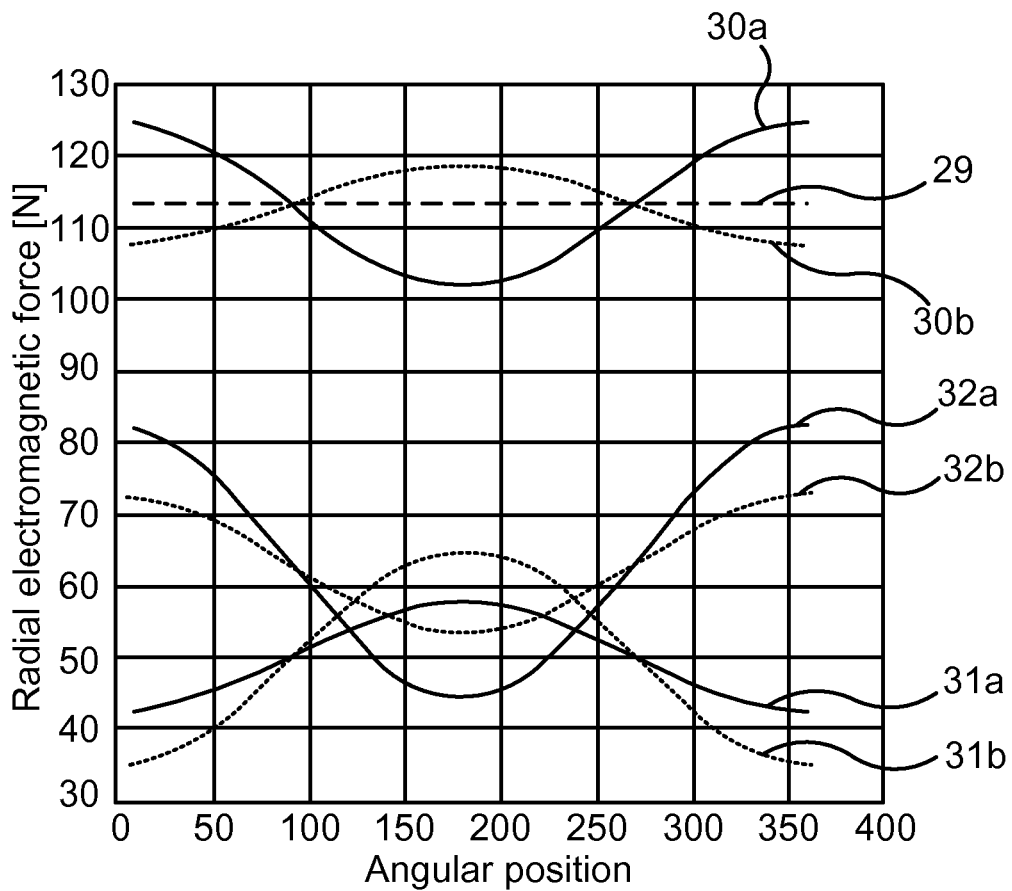
FIG. 4 is a schematic graph illustrating radial forces on a rotor in the two situations of when the two average gap distances are equal and when the average inner gap distance is smaller than the average outer gap distance.

FIG. 4 is a schematic graph illustrating radial forces on a rotor in the two situations of when the two average gap distances are equal and when the average inner gap distance is smaller than the outer average gap distance.

The vertical axis represents radial electromagnetic force in Newtons and the horizontal axis represents angular position in degrees.

A straight dashed line 29 represents total radial force when there is no eccentricity.

The other lines are all plots in the asymmetric situation that there is 50 percent eccentricity. Of these, the solid lines 30a, 31a and 32a relate to a situation when the average inner gap distance $\delta_i$ is (substantially) equal to the average outer gap distance $\delta_o$. The dotted lines 30b, 31b and 31c relate to a situation when the average inner gap distance $\delta_i$ is smaller than the average outer gap distance $\delta_o$.

Specifically, the lowermost solid line 31a represents the inner radial force, the middle solid line 32a represents the outer radial force and the upper solid line 30a represents total radial force, all related to the situation when the average inner gap distance $\delta_i$ is (substantially) equal to the average outer gap distance $\delta_o$. Lowermost, middle and upper, when referring to forces of FIG. 4, refer to the relative position of a centre axis of the sinusoidal variation, i.e. the average level of each force.

Moreover, the lowermost dotted line 31b represents the inner radial force, the middle dotted line 32b represents the outer radial force and the upper dotted line 30b represents total radial force, all related to the situation when the average inner gap distance $\delta_i$ is smaller than the average outer gap distance $\delta_o$.

Significantly, the amplitude of the total radial force 30b is lower for the situation when the average inner gap distance $\delta_i$ is smaller than the average outer gap distance $\delta_o$. This significantly reduces mechanical stress on components of the electrical machine compared to the situation when the average inner gap distance $\delta_i$ is equal to the average outer gap distance $\delta_o$.

There are two ways in which to achieve that the average inner gap distance $\delta_i$ is smaller than the average outer gap distance $\delta_o$. Compared to an equal gap machine, the inner gap distance $\delta_i$ can be reduced and/or the outer gap distance $\delta_o$ can be increased. One way to make it easier to keep outer machine dimensions the same, is by reducing the inner gap distance $\delta_i$.

The inner machine rotor structure is relatively more rigid in comparison with the outer machine where magnets are more like to fly away from rotor due to centrifugal force. Hence, any thick protection layer (glass fibre, carbon fibre, etc.) provided in an equal gap machine can in many cases be removed or reduced to thereby to reduce the inner gap $\delta_i$. In addition to reducing radial forces in a situation of asymmetry, this solution also reduces the amount of permanent magnets which is needed for a certain flux and a resulting torque.

For instance, an example of a 5 MW double stator machine is here used for illustration. In an equal gap distance design, the gap distance is 6.5 mm for both gap distances $\delta$o and $\delta$i.

When the inner gap distance is reduced to 5 mm, the efficiency and power factor are about the same as the equal gap distance design, but only requiring magnets weighing about 86% of the equal gap distance design. Hence, not only does this embodiment provide a situation with reduced radial forces in an asymmetric situation, but the magnet weight is also reduced by 14%.

Figure 5:
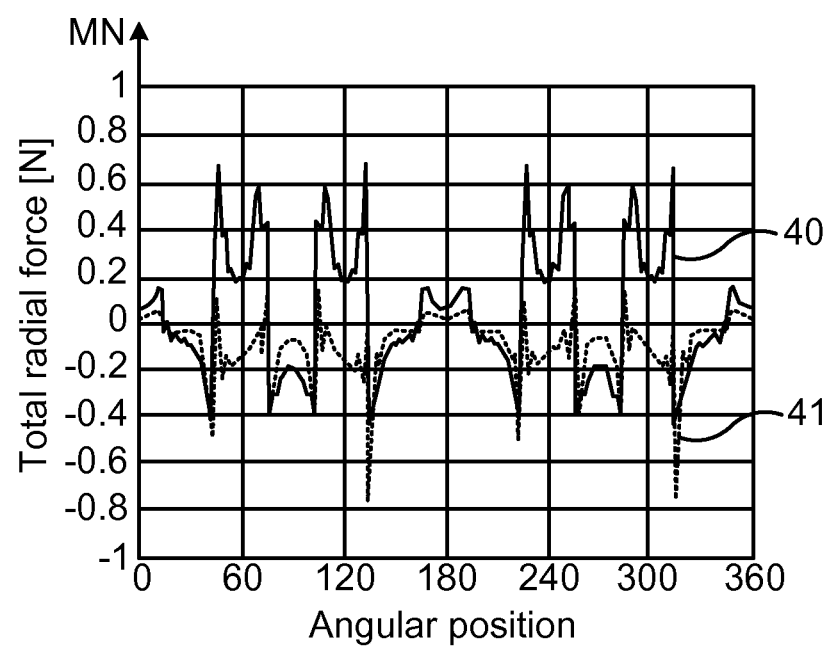
FIG. 5 is a schematic graph illustrating total radio force on the rotor of the electrical machine of FIG. 1 in the two different situations of FIG. 4.

FIG. 5 is a schematic graph illustrating total radial force on the rotor of the electrical machine of FIG. 1 in the two different situations of FIG. 4. The horizontal axis represents angular position in degrees and the vertical axis represents total radial force in MN.

The solid line 40 represents total radial force when the average inner gap distance $\delta_i$ is (substantially) equal to the average outer gap distance $\delta_o$. The dashed line 41 represents total radial force when the average inner gap distance $\delta_i$ is smaller than the average outer gap distance $\delta_o$. It is apparent that situation when the average inner gap distance $\delta_i$ is smaller than the average outer gap distance $\delta_o$ results in a case where the rotor is subjected with significantly lower total radial force.

While embodiments presented herein in the context of a double stator machine, the same principles are applicable for machines with three or more stators.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A multi-stator rotating electrical machine comprising:
   an inner stator;
   an outer stator;
   a rotor provided radially between inner stator and the outer stator;
   an inner gap distance ($\delta$i) between the rotor and the inner stator; and
   an outer gap distance ($\delta$o) between the rotor and the outer stator;
   wherein an average of the inner gap distance ($\delta$i) is between 75 and 80 percent of an average of the outer gap distance ($\delta$o).

2. The multi-stator rotating electrical machine according to claim 1, wherein the average of the inner gap distance ($\delta$o) satisfies the following equation:

$$(d(F\_\text{tot}))/d\delta_i = 0,$$

where F_tot represents total radial force.

3. The multi-stator rotating electrical machine according to claim 1, wherein the average of the outer gap distance ($\delta$o) satisfies the following equation:

$$(d(F\_\text{tot}))/d\delta_o = 0,$$

where F_tot represents total radial force.

* * * * *